(No Model.)
C. P. PARKER.
CHECK ROW ATTACHMENT FOR SEED PLANTERS.
No. 281,919. Patented July 24, 1883.
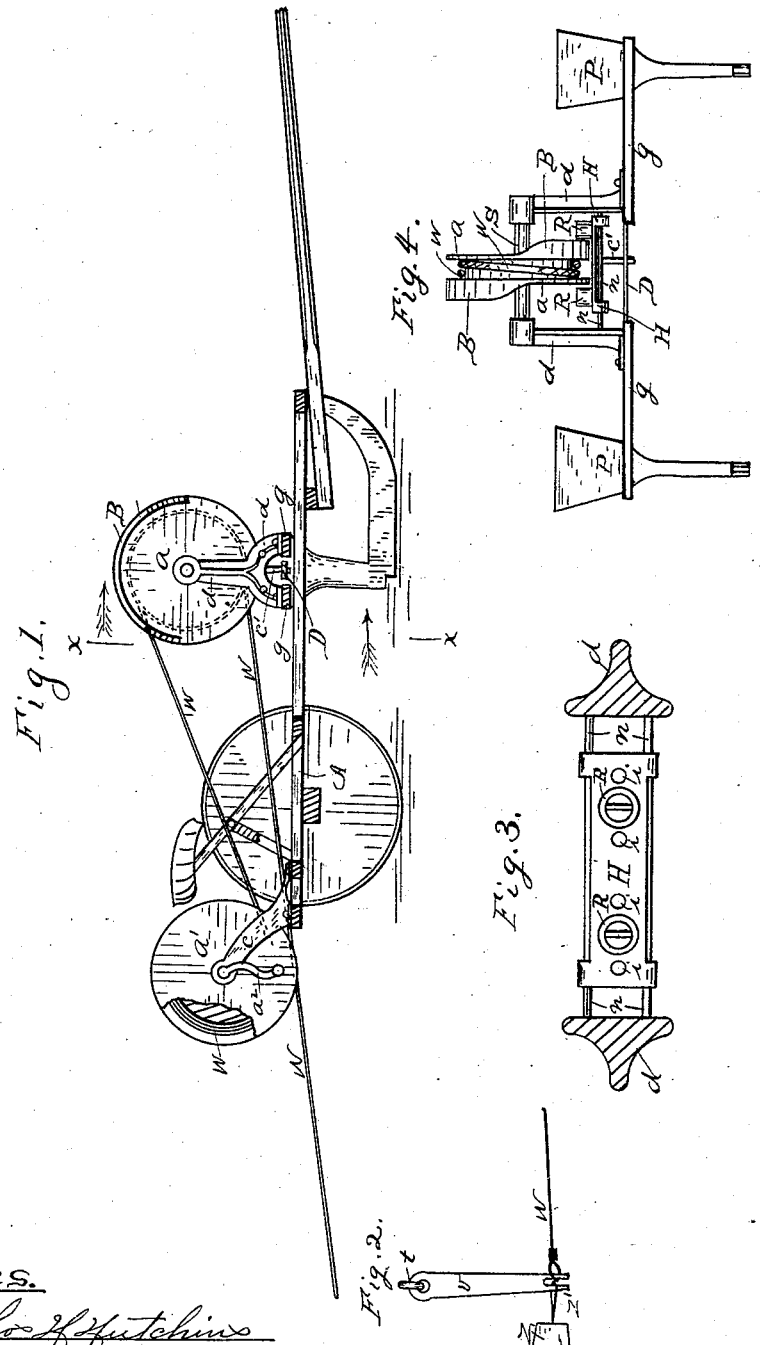
Witnesses.
Thos. H. Hutchins
Wm. J. Hutchins
Inventor.
Charles P. Parker.

UNITED STATES PATENT OFFICE.

CHARLES P. PARKER, OF JOLIET, ILLINOIS.

CHECK-ROW ATTACHMENT FOR SEED-PLANTERS.

SPECIFICATION forming part of Letters Patent No. 281,919, dated July 24, 1883.

Application filed May 9, 1883. (No model.)

*To all whom it may concern:*

Be it known that I, CHARLES P. PARKER, a citizen of the United States of America, residing at Joliet, in the county of Will and State of Illinois, have invented certain new and useful Improvements in Check-Row Attachments for Seed-Planters, of which the following is a specification, reference being had therein to the accompanying drawings.

Figure 1 is a side elevation of the attachment; Fig 2, a plan view on top of the anchor; Fig. 3, a plan view on the top of the drop-lever slide; and Fig. 4, a rear elevation of the machine on line $x$ of Fig. 1, looking in the direction of the arrow.

This invention relates to an attachment to seed-planters for the purpose of actuating the dropping portion, so as to plant the seed in hills in rows each way across the field, and is of that class of machines commonly called "check-row attachments," and is designed to operate by means of a wire or cord, which is fastened at one end, at the side of the field, to a suitable anchor, and unwinds and pays out the wire or cord off a drum on the machine as the machine travels forward, by means of which the working portions of the machine are actuated.

Referring to the drawings, Fig. 1 is a side elevation of the device as applied to an ordinary corn-planter, and designed to travel in the direction shown by the arrows. The drum $a'$ contains the plain wire or cord $w$, which is designed to be kept wound up thereon, and only unwound when its loose end is fastened to the earth and the machine travels forward. The wire $w$ passes off of the drum $a'$ over the drum $a$ in front of it, taking about one and one-half turn around it, so that its frictional contact with the drum $a$ will be sufficient to prevent slipping of the wire $w$ around its periphery. The drum $a$ is provided on either side with cam-flanges B, as shown more particularly in Fig. 4, arranged so that when the drum $a$ rotates the cams B alternately reciprocate the drop-lever slide H by means of the cams rotating between the wrist-pins R on the slide H, throwing it alternately either way, so that the drop-lever $c'$, attached to it below, will throw the seed-slide D either way to drop seed contained in the seed-boxes P. The wrist-pins R are provided with ordinary friction-rollers, to impinge against the cams B to prevent friction. The drop-lever slide H reciprocates on two parallel rods or ways, $n\ n$, supported by the posts $d\ d$ a short distance above the seed-slide D, to make room for the drop-lever $c'$, which attaches permanently to the under side of the drop-lever slide H.

$g$ is the frame of the planter, upon which the attachment described is supported.

The mode of operation of the machine is as follows: In the first instance the wire $w$ is wound up on the drum $a'$, and wire enough is contained by the drum to reach across the field, or as far as may be desired. Before the machine starts across the field, the end of the wire $w$ is attached to the anchor $v$, (shown in Fig. 2,) so a loop on its end will slip over one of the tines of the fork on the end of the anchor $v$, as shown in said figure, to make that end fast. To the other tine of the forked end of said anchor is attached a heavy weight, $z$, of a sufficient weight to not be dragged by the tension on the wire $w$ as the machine travels forward. The machine then travels forward, and as it does so the wire $w$ is paid out in a direct line in the rear of the machine as it unwinds off the two drums, or, in other words, unwinds off of drum $a'$ and passes over drum $a$, and as it so unwinds rotates the cam-drum $a$ and operates the seed-slide in the manner stated. When the machine reaches the opposite side of the field, a smart jerk on the wire $w$ will disengage it from the anchor $v$, so that it can be wound up on the drum $a'$ by means of the crank $a^2$, when the machine can be turned about and the wire fastened in like manner to a similar anchor on that side of the field for another like operation. By this means the wire has no knots, and, being plain, is of greater strength and less liable to stretch than a knotted wire, and as the wire is paid out in the rear of the machine it is not subject to entanglement with obstructions, as in case where the machine travels over a knotted or other wire that is stretched and anchored at either side of the field. In such case the machine, as it travels, drags the wire sidewise over the ground on its return, by means of which the wire will catch against obstructions and break, and cause the seed to be dropped out of line with the previously-dropped hills.

In this device the dropping of the seed must be absolutely accurate, as by passing the wire more than once around drum $a$ its frictional contact with the said drum will prevent the wire from slipping on said drum. By such construction no separate reel is needed for the wire. The wire is always on and attached to the drums and ready for use. The size of drum $a$ determines the distance apart the drop is to be made. The drum is intended to be of such diameter as to drop the usual distance apart, and for different distances special drums can be used.

For drill purposes any number of cams B, any distance apart, can be used; or the cams may be moved so as to cause the seed-slide to run fast to drop seed in drills.

The anchor $v$ is pivoted to the earth at its outer end by the pin $t$, so that its other forked end can move forward when the jerk is applied to the wire $w$ to disengage it, as aforesaid.

I am aware a single drum upon which to wind up the wire has been used on a seed-planter before, and that the wire has been paid out off such a drum as the machine advances to actuate the dropping parts; but I am not aware a pair of drums, one having the cams to reciprocate the seed-slide, has been used, as herein described and illustrated.

Having thus described my invention, what I claim as new, and desire to secure by Letters Patent, is as follows, to wit:

1. The combination of the drum $a'$, wire $w$, drum $a$, having the cams B, drop-lever slide H, ways $n\,n$, drop-lever $c'$, and seed-slide D, adapted to operate as and for the purpose set forth.

2. The combination of the drum $a'$, drum $a$, having the cams B, drop-lever slide H, ways $n\,n$, drop-lever $c'$, seed-slide D, plain wire $w$, and anchor $v$, arranged, as described, to hold said wire and be detachable from it, all adapted to operate as and for the purpose set forth.

3. The combination of the wire $w$, anchor $v$, having one end staked to the ground and its loose end forked, and the weight $z$, all adapted to operate as and for the purpose set forth.

CHARLES P. PARKER.

Witnesses:
   THOS. H. HUTCHINS,
   WM. J. HUTCHINS.